Oct. 21, 1947.          J. N. HELPBRINGER                2,429,461
           CONTINUOUSLY OPERATING ICE CUBE MAKING MACHINE
                  Filed July 26, 1944        5 Sheets-Sheet 1

INVENTOR.
James Nelson Helpbringer
BY
Loftus, Moore, Olson & Treder
attys.

Oct. 21, 1947.  J. N. HELPBRINGER  2,429,461
CONTINUOUSLY OPERATING ICE CUBE MAKING MACHINE
Filed July 26, 1944   5 Sheets-Sheet 3

INVENTOR.
James Nelson Helpbringer
BY
Ettes, Moore, Olstrie Trexler
attys.

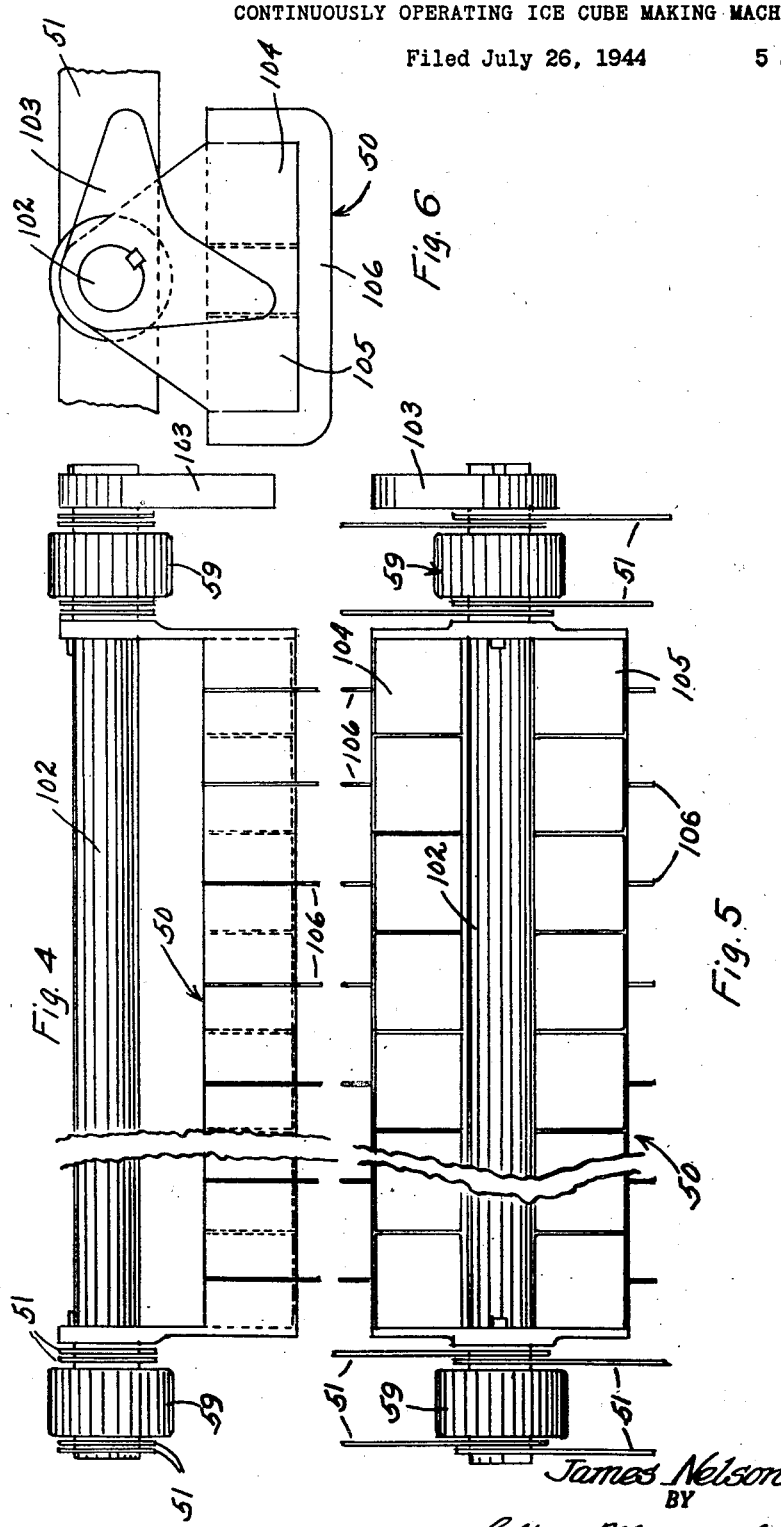

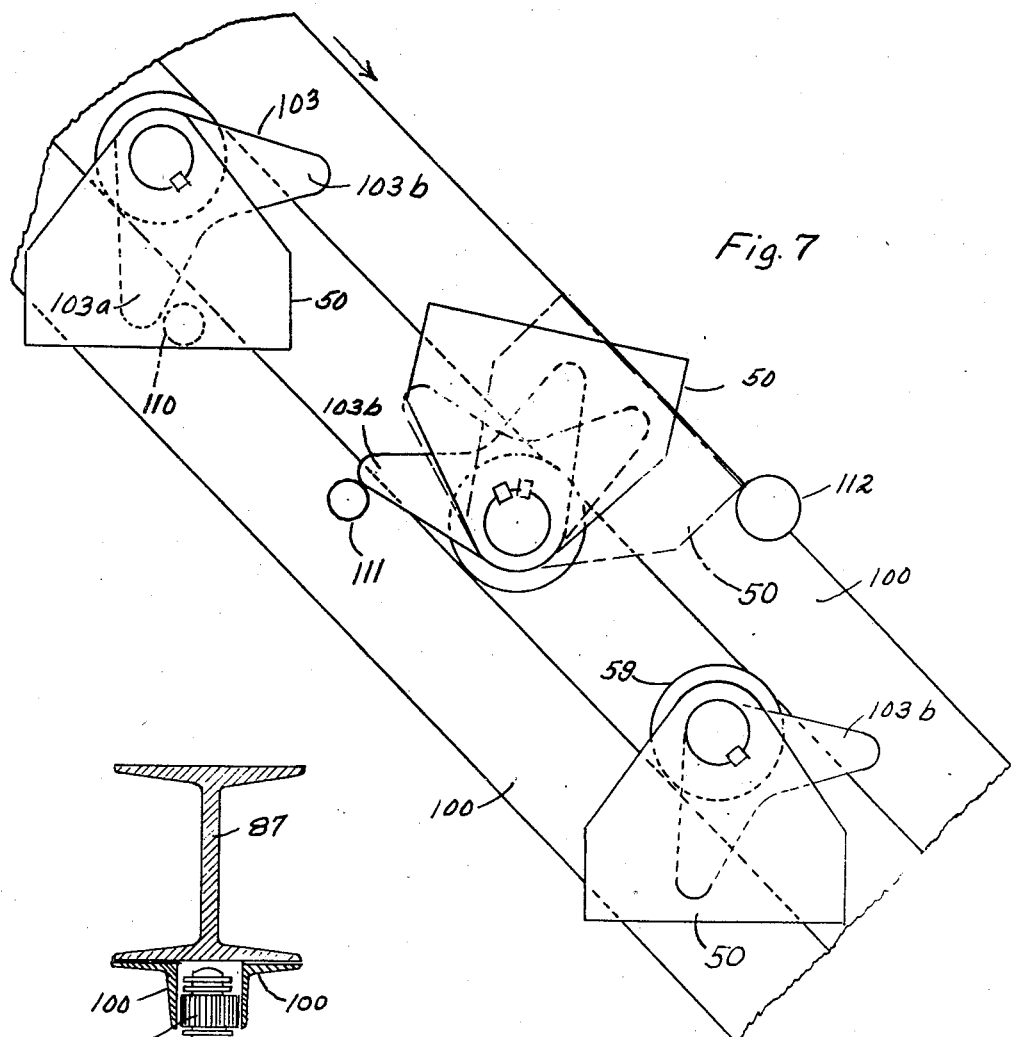
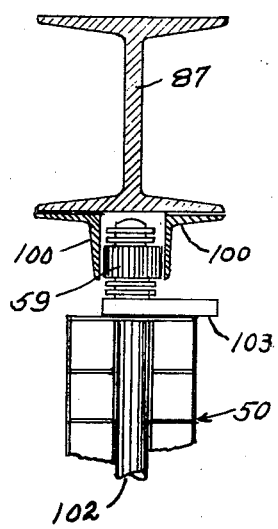

Patented Oct. 21, 1947

2,429,461

UNITED STATES PATENT OFFICE 2,429,461

CONTINUOUSLY OPERATING ICE CUBE MAKING MACHINE

James Nelson Helpbringer, Evanston, Ill.

Application July 26, 1944, Serial No. 546,680

7 Claims. (Cl. 62—106)

This invention relates to improvements in refrigerating apparatus, and particularly to an apparatus for solidifying or freezing water or other substances or liquids into units of desired shape and size.

It is an object of the invention to provide improved refrigerating apparatus of the type defined. More specifically stated, it is an object of the invention to provide a refrigerating apparatus which is more economical and efficient in operation, and wherein the parts are arranged to facilitate a maximum and efficient interexchange of heat between the refrigerant medium and the product being cooled or frozen, so as to effect the refrigeration thereof in an expeditious and economical manner.

A further object of the invention is to provide improved refrigerating apparatus to effect the cooling and preferably the freezing or solidifying of substances, such for example as water or other liquids, which is continuous and automatic in operation, and wherein the solidified or frozen units may be formed of a desired shape and size, and continuously and automatically delivered at a point of delivery from the apparatus.

A still further object of the invention is to provide improved refrigerating apparatus for producing ice cubes.

Various other objects, advantages and features of the invention will be apparent from the following specification when taken in connection with the accompanying drawings, wherein a preferred embodiment of the invention is set forth for purposes of illustration.

In the drawings, wherein like reference numerals refer to like parts throughout:

Fig. 4 is a detail view, on a further enlarged scale, of one of the freezing trays and associated conveyor parts;

Fig. 5 is a plan view of the tray structure of Fig. 4;

Fig. 6 is an end view of the structure of Fig. 4;

Fig. 7 is an illustrative view more particularly showing the dumping mechanism for removing the frozen ice cubes from the freezing trays; and Fig. 8 is a detail illustrative view showing the manner of supporting and guiding the freezing tray conveyor parts.

Figure 1:
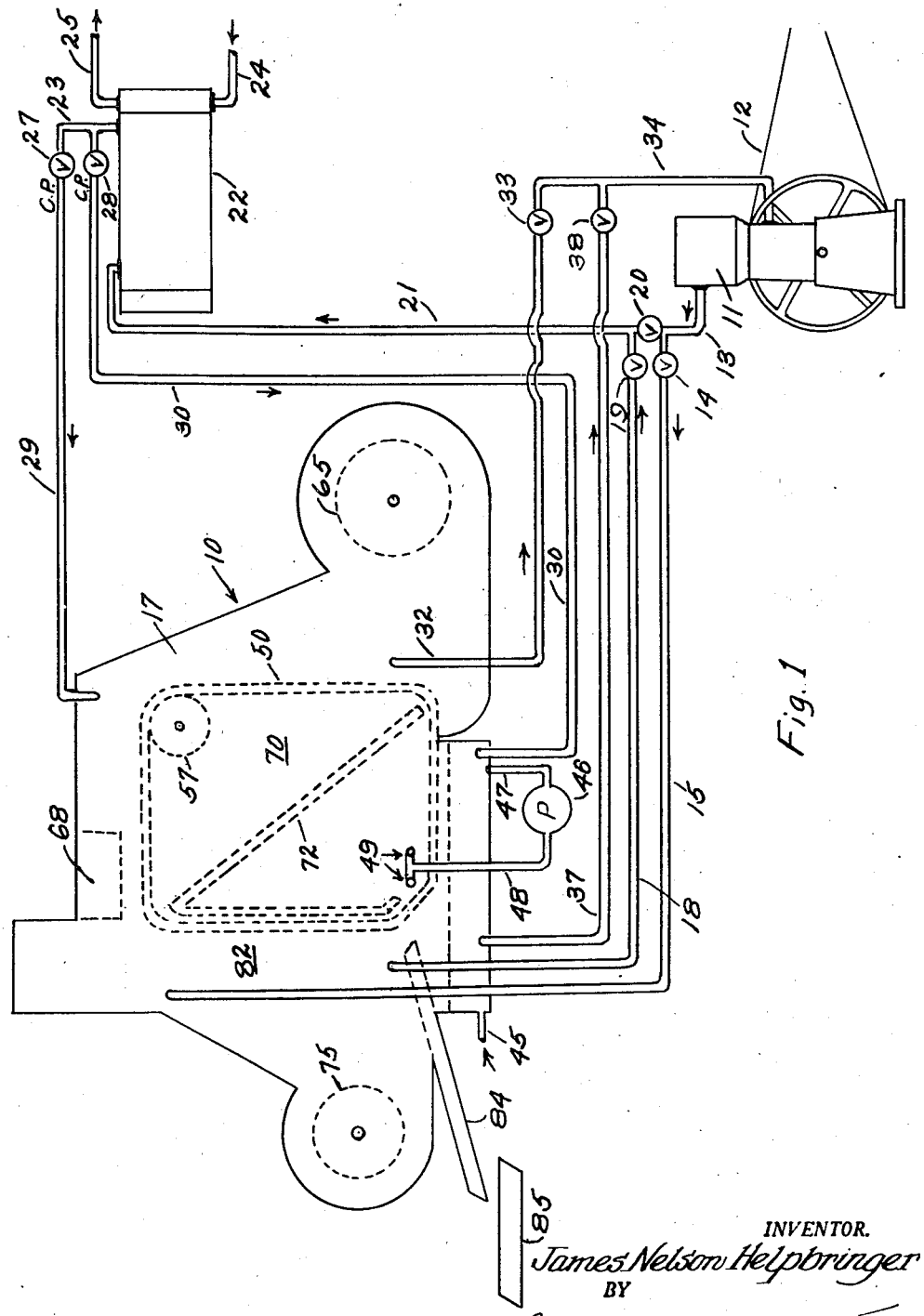
Fig. 1 is a general assembly view, diagrammatic in form, of a refrigerating system incorporating a cooling apparatus constructed in accordance with and embodying the principles of the invention.

In the drawings the invention has been illustrated as applied to a refrigerating apparatus for making ice cubes, as the invention, in certain of its important aspects, is particularly adapted to this use. It is to be understood, however, that the invention is also adapted for use in the refrigerating, solidifying, or freezing of other substances and liquids, whereby to produce blocks or shapes thereof, of predetermined size.

Referring more particularly to the drawings, in Fig. 1 a refrigerating system is diagrammatically set forth, in which the cooling apparatus of the invention, generally indicated by the numeral 10, is incorporated. As illustrated, a compressor 11 which may be conventional in form, is driven by means of a belt 12, and compresses the refrigerant gas and delivers it to an outlet supply pipe 13. A portion of the hot compressed gas is bled from the pipe 13, under control of a valve 14, and delivered by means of a pipe 15 to a series of coils 16, 16a, Fig. 3, disposed within the casing 17 of the cooling apparatus 10. The coils 16, 16a, being filled with the hot compressed refrigerant gas, form heating coils within the cooling apparatus, for a purpose later to be described.

The refrigerant gas is returned from the coils 16, 16a by means of a pipe 18, Fig. 1, through the valve 19 back to the supply pipe 13. Preferably only a portion of the hot gases are bled from the supply pipe 13 for passage through the heating coils 16, 16a. Accordingly the gas returned through the pipe 18 mixes with the remainder of the gas from the pipe 13, under control of valve 20, the thus combined gases being transmitted by means of a pipe 21 to a condenser structure 22 which may be of conventional form and construction.

Within the condenser the hot refrigerant gas is condensed into liquid form and delivered to an outlet supply pipe 23, as will be readily understood. Cooling water for the condenser may be introduced thereto by means of a pipe 24, from a suitable source of cooling water supply, and exhausted from the condenser through a pipe 25.

From the condenser outlet pipe or conduit 23 the refrigerant is delivered under control of a pair of constant pressure expansion valves 27 and 28 to a pair of supply pipes 29 and 30 leading to the cooling apparatus 10. The pipe 29 is connected within the apparatus to a series of refrigerating coils 31, 31a, Fig. 3. Within the coils 31, 31a the refrigerant is evaporated, as will be understood, the coils thus forming the evaporator or cooling coils of the system. From the coils 31, 31a the refrigerant is returned by means of a pipe line 32, Figs. 1 and 3, under control of a valve 33, Fig. 1, to the inlet pipe 34 of the compressor.

Figure 3:
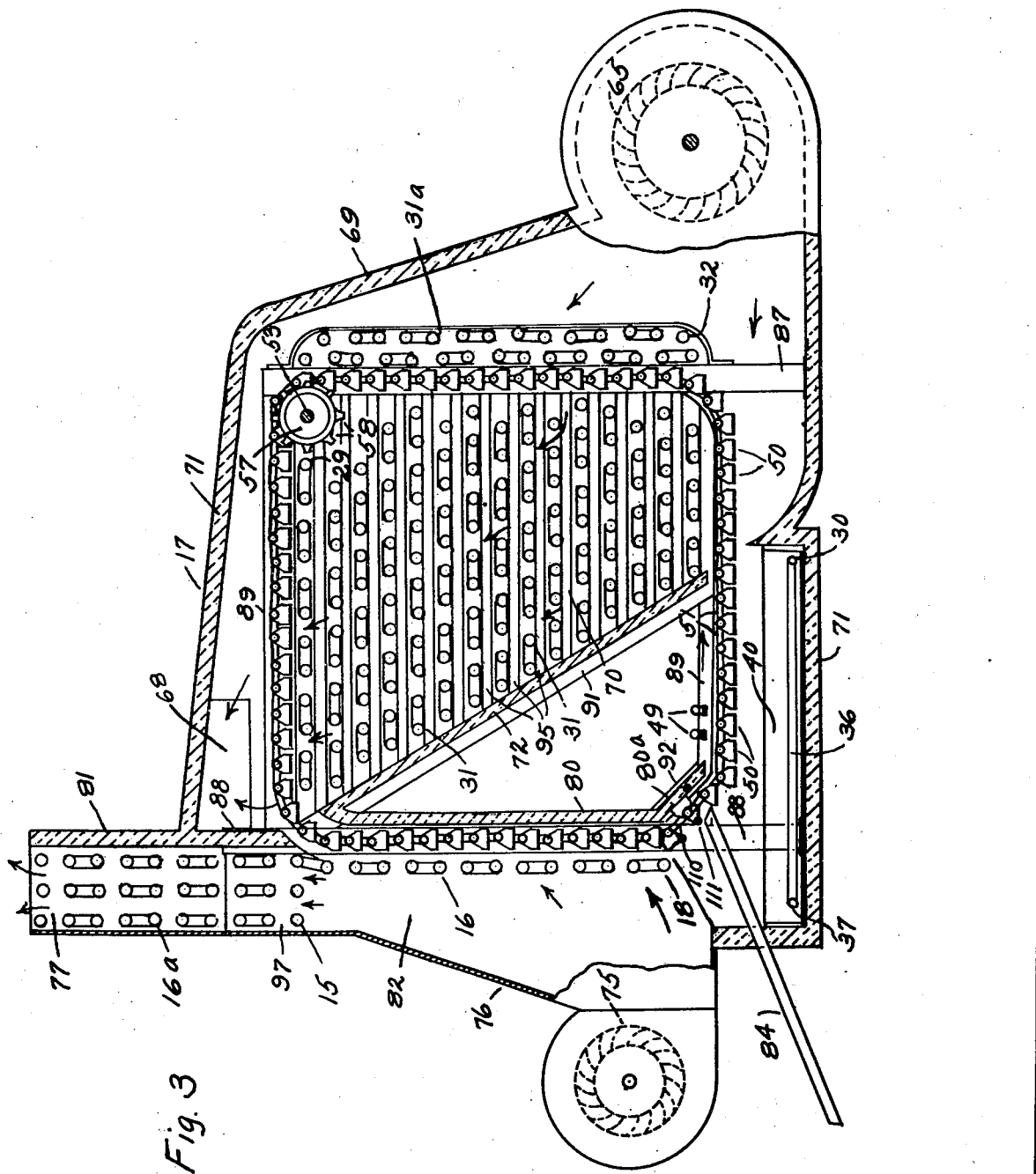
Fig. 3 is a longitudinal sectional view of the apparatus of Fig. 2, on a somewhat further enlarged scale, and taken as indicated by the line 3—3 of Fig. 2.

The refrigerant supplied to the cooling apparatus through the pipe 30 is transmitted within the apparatus through a cooling coil 36, Fig. 3, and is returned from the coil by means of a pipe 37 under control of a valve 38 back to the compressor inlet supply pipe 34, and for recirculation by the compressor in conventional manner. The cooling coil 36 is disposed within a pan structure 40, Fig. 3, and constitutes a pre-cooling coil for the substance or material to be frozen, as will presently be more particularly described.

The material or substance to be refrigerated, in the present instance water, is supplied to the cooling apparatus from a supply pipe 45, Fig. 1, communicating with a suitable source of supply. The water is delivered from the pipe 45 to the reservoir pan 40, Fig. 3, wherein it is cooled to a temperature approaching the freezing point, by means of the pre-cooling coil 36.

A pump 46, Fig. 1, circulates the water from the pan 40 by means of conduits 47 and 48 to a plurality of spray nozzles or pipes 49, Figs. 1 and 3, disposed within the cooling apparatus in position to spray the water downwardly into the freezing trays. The freezing trays 50, the details of which will be later described, are connected by means of a series of links 51 into an endless conveyor structure adapted to be continuously propelled at a predetermined rate of travel during operation of the machine.

Figure 2:
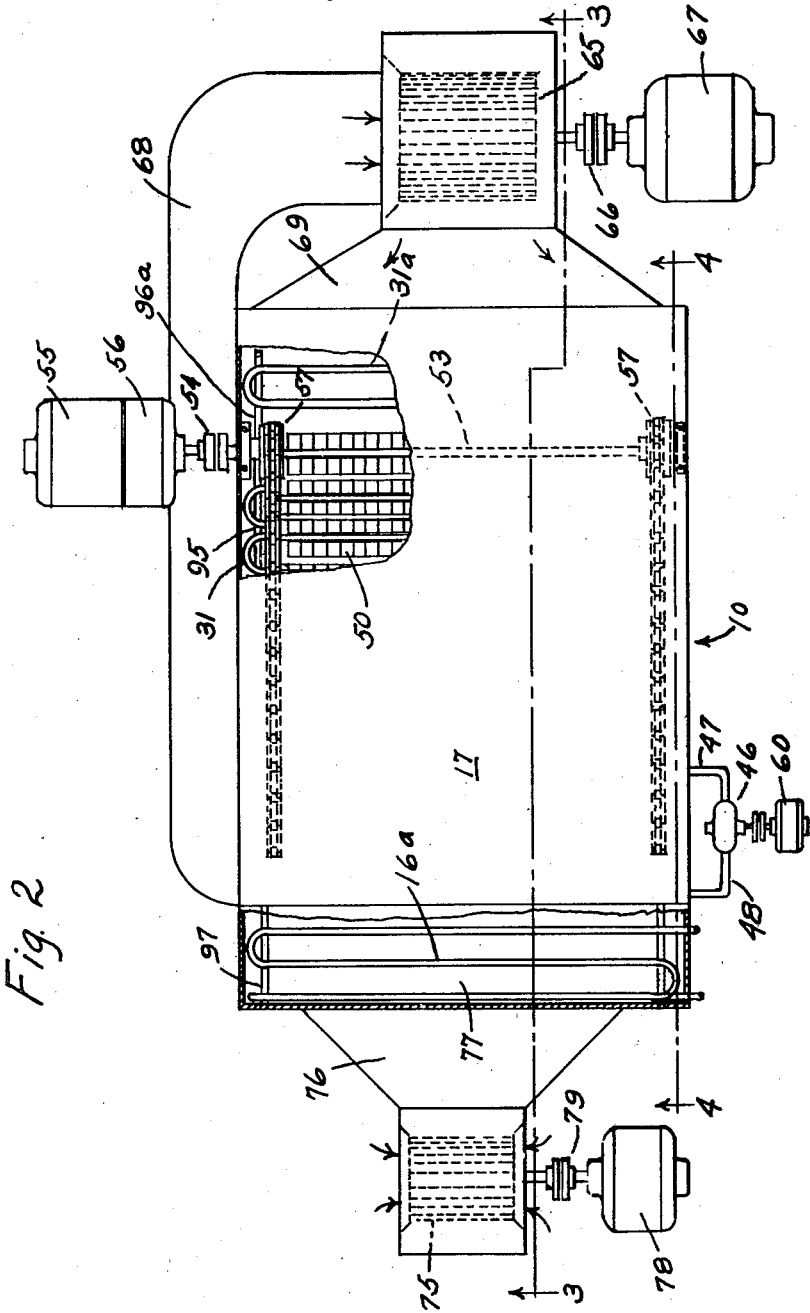
Fig. 2 is a plan view of the cooling apparatus of Fig. 1, on an enlarged scale, parts of the casing being broken away to illustrate the internal construction.

To effect the driving of the conveyor a main drive shaft 53 is provided, Figs. 2 and 3, driven by means of a clutch 54 from a suitable driving source such for example as an electric motor 55 having built-in reduction gearing as indicated at 56. Preferably the motor 55 is of the variable speed type whereby the speed of operation of the driving shaft 53 may be readily varied and controlled. The drive shaft 53 carries a pair of driving sprockets 57 for propelling the conveyor. As best shown in Fig. 3, the drive sprockets are provided with spaced tooth-like projections 58 which are adapted to engage between the rollers 59, Fig. 5, forming a part of the conveyor structure. By this means the conveyor is positively interlocked with the driving sprockets 57 to effect positive and accurate speed control.

Fig. 2 also illustrates the driving motor 60 for the water pump 46. Preferably this motor is also of the variable speed type whereby to adjustably control the speed of operation of the pump, and resultingly the rate of water delivery from the spray nozzles 49.

In the operation of the machine, the trays 50 are first transmitted beneath the spray nozzles 49 by means of which they are filled with the material to be refrigerated, water to be frozen in the particular embodiment illustrated. The excess water from the spray nozzles drains into the pan 40 from which it is recirculated to the nozzles by the pump 46. In the pan the water is continuously pre-cooled by the coil 36, as previously described. The trays 50 pass from the filling nozzles to the right, as indicated by the arrow in Fig. 3, along the lower reach of the conveyor, and then upwardly, and then to the left along the upper reach of the conveyor, under the propelling action of the driving sprockets 57. During the latter part of their travel along the lower reach of the conveyor, and during their upward movement, and during their travel to the left along the upper reach of the conveyor, the freezing trays are continuously subjected to a blast of cooling air whereby to effect the freezing of the water into ice blocks or cubes within the freezing trays.

To effect this refrigerating action a centrifugal fan or blower 65 is provided, Figs. 2 and 3, driven by means of a clutch 66 from a variable speed electric driving motor 67. The blower 65 draws air from a conduit 68 and propels it through a cowling 69, Figs. 2 and 3, through the refrigerating chamber 70 and across the evaporator cooling coils 31, 31a, and across the freezing trays, whereby to effect the refrigerating or freezing operation. As best shown in Fig. 3, the upper end of the conduit 68 leads from the upper end of the refrigerating chamber 70. By this means it will be seen that the blower 65 continuously circulates the same cold air across the evaporator coils 31, 31a and across the freezing trays, whereby to effect maximum thermal economy. As also best shown in Fig. 3, insulation 71 is provided for the various exposed surfaces of the apparatus, whereby to minimize thermal loss. An insulated baffle wall 72 divides the refrigerating chamber 70 from the remainder of the apparatus, whereby to control the path of travel of the air blast from the blower 65 across the cooling coils and trays and into the recirculating conduit 68.

As the trays 50 leave the refrigerating chamber, after the ice blocks have been frozen, the trays pass downwardly along the left reach of the conveyor, as seen in Fig. 3. During this movement the trays are subjected to a blast of warm air, sufficient to loosen the ice blocks from the tray surfaces, but not sufficient to otherwise melt the ice. For this purpose a centrifugal fan or blower 75, Figs. 2 and 3, is provided for withdrawing air from atmosphere and for projecting it through a cowling 76 across the heating coils 16, 16a and into engagement with the descending freezing trays to effect the aforesaid partial melting operation. The air projected by the fan 75 passes upwardly and outwardly from the apparatus through the exhaust flume 77. The heated air is projected to atmosphere and may be utilized to maintain the temperature in the room within which the refrigerating apparatus 10 is located. The fan or blower 75 is driven by means of a variable speed electric motor 78 through the intermediary of a clutch structure 79. The variable speed characteristics of the motors 67 and 78 may be utilized to adjustably control the rates of flow of the refrigerating and warming air blasts. Insulated baffle walls 80 and 81, Fig. 3, confine the warm air blast for properly directed travel through the warming chamber indicated in Fig. 3 by the reference numeral 82.

As the freezing trays reach the lower reach of the conveyor the loosened ice blocks are ejected therefrom by inverting the trays so that the blocks fall out by gravity and impact in the manner hereinafter to be more specifically described. The blocks fall from the ice trays onto an inclined chute structure 84 by means of which they are delivered to a table or delivery platform 85, Fig. 1.

The frame and support structure for the refrigerating coils is best shown in Figs. 2 and 3.

As indicated, the main support structure for the coils and for the conveyor comprises a pair of uprights 87 at the forward end of the machine, adjacent the blower 65, and a pair of uprights 88 at the rear end of the machine, adjacent the blower 75. These uprights may preferably be I-beams, as indicated in Fig. 8. The uprights are connected longitudinally at their upper and lower portions by a series of longitudinally and transversely extending beam members 89, Fig. 3. Angularly disposed beams 91 and 92, Fig. 3, on opposite sides of the frame form the supporting structures for the baffle walls 72 and 80a, respectively, as seen in Fig. 3.

The uprights support a series of longitudinally extending bars 95, Fig. 2, in parallel relationship, these bars in turn forming a support for the refrigerating or evaporator coils 31. A pair of strap members 96, Fig. 3, are secured to the forward uprights 87. These strap members and the associated vertical plate members 96a, Fig. 2, form a support for the evaporator coils 31a. Similar plate members 97, Fig. 2, may be employed to support the heating coils 16 and 16a.

As indicated in Figs. 7 and 12, the uprights 87 and 88, and longitudinally extending beams 89, are provided at each side of the frame with angle irons 100 forming a track structure for the rollers 59 of the ice trays. As will be understood, duplicate tracks in generally rectangular layout are provided on opposite sides of the frame, for guiding the ice trays and the conveyor in their movements.

The details of the ice trays and of the conveyor structure are illustrated in Figs. 4, 5 and 6. As shown, each ice tray, indicated generally by the numeral 50, is supported from and keyed to a cross shaft 102. The cross shafts 102 extend between the side frames of the machine and are provided on their ends with rollers 59 engageable with the angle iron track members 100. The rollers 59 are loosely mounted on the shafts 102, for free rolling movement on the tracks. As previously stated, the trays 50 are keyed to the shafts 102 and are normally held by gravity in a vertically depending position as the conveyor is moved, as indicated in Figs. 3 and 4. A cam member 103 is keyed to one end of each of the shafts, these cam members being provided to invert the trays to effect a dumping of the ice cubes, in a manner presently to be described. The ends of the links 51 are journalled on the shafts 102, thereby connecting the ice trays in predetermined spaced relationship into a continuous conveyor structure.

Each ice tray is formed with an aligned series of compartments 104 and 105 on either side of the shafts 102, so that the shafts will not interfere with the free falling of the ice cubes from the trays. As will be understood, these compartments may be of any shape or size desired, depending upon the material to be frozen, and the desired shape and size thereof. Fins 106 are provided on the ice trays to facilitate heat transfer to the material within the compartments.

Referring to Figs. 3 and 7, it will be seen that the track forming angle irons 100 adjacent the dumping station, at the lower lefthand corner of the conveyor track, as seen in Fig. 3, are provided with a pair of abutment pins 110 and 111 engageable by and cooperable with the cam members 103. An abutment pin 112 is also provided adjacent the conveyor track, so positioned as to provide an impact abutment engageable with the body of the ice tray structure. Referring to Fig. 7, as the ice trays move downwardly and forwardly at the dumping station, in the direction of the arrow, the wing 103a of the cam 103 of an ice tray to be dumped first engages the stationary pin 110, so that as the conveyor progresses the tray is rotated partially in a clockwise direction. This partial rotation causes the second wing 103b of the cam to be engaged by the stationary pin 111, as the cam reaches this pin, whereby to further the clockwise rotation of the ice tray through an angle of slightly more than 180 degrees, or slightly past a vertical position. The ice tray then falls by gravity until the body thereof impacts against the stationary abutment pin 112, as indicated in dot and dash lines in Fig. 7. As the conveyor then further progresses, the pin 112 causes the reverse or counterclockwise rotation of the ice tray again past the vertical, whereupon the tray again falls into normal depending position. The twice movement of the tray past a vertical position, coupled with the jarring impact against the abutment 112, causes the ice cubes which have been loosened by the blast of warm air from the fan 75 to drop upon the inclined chute 84 for delivery from the machine. The evacuated tray 50, after being returned to suspended or upright position, returns to the filling nozzles 47 and the process is repeated.

It will be seen that by the arrangement provided frozen or solidified blocks of the substance to be refrigerated, in desired size and shape, will be automatically and continuously formed and transmitted from the machine. A maximum efficiency in the interchange of heat between the refrigerant and the substance to be frozen is attained in that both the cooling effects of the evaporator coils 31, 31a and the heating effects of the heating coils 16, 16a are utilized upon the frozen material, while at the same time the coils 16 and 16a effect a partial cooling of the refrigerant gases, thus partially performing the function of the condenser of the refrigerant system. The blowers 65 and 75 circulate the cooling and heating air within the apparatus along independent and controlled paths of travel. The blower 65 continuously recirculates the cooling air across the evaporator coils, promoting maximum efficiency, whereas the warm exhaust air from the fan 75 is ejected from the machine and may be utilized to maintain room temperature. The proportioning between the coils 16 and 16a determines the extent of heat which will be transmitted to the frozen ice cubes, inasmuch as the air from the fan 75 passes only through the coils 16 before it contacts the ice blocks in the trays. The action of the coils may also be controlled by the valves 14 and 19, which predetermine the amount of the hot compressed refrigerant gases which will be bled from the main outlet pipe 13 from the compressor. The variable speed driving motors 67 and 78 for the fans 65 and 75, respectively, may be adjusted to control the volume of the air blasts, whereas the variable speed motors 55 and 60 control the speed of the conveyor and the volume of water emitted from the spray nozzles, respectively. By reason of the fact that the material to be frozen is first introduced into the pan 40, from which it is circulated to the supply nozzles by the pump 46, it may be pre-cooled substantially to the freezing point, if desired, before it is introduced into the freezing trays. This insures prompt and rapid freezing. The warm air from the fan 75, as has been stated, melts the ice only sufficiently to release it from the walls of the trays, but without substantial melting of the blocks. The machine is automatic in operation and requires no attention other than the proper valve adjustment and speed adjustment of the parts.

It is obvious that various changes may be made in the specific embodiments set forth for purposes of illustration without departing from the spirit of the invention. The invention is accordingly not to be limited to the specific embodiments shown and described, but only as indicated in the following claims.

The invention is hereby claimed as follows:

1. A refrigerating apparatus comprising a plurality of containers adapted to retain a substance to be refrigerated, means for propelling the containers in an aligned sequence along a predetermined path of travel, refrigerating means disposed along the path of travel of the containers for effecting a refrigerating action upon the substance while in the containers to effect a solidifying of the substance, heating means disposed along the path of travel of the containers for effecting a heating action upon the substance to free the substance from the container surfaces, means disposed at a predetermined ejector station along the path of travel of the containers for moving the containers to inverted position, and means for imparting an impact to the containers while in inverted position to eject the solidified substance therefrom and the said impact means being adapted to return the containers to normal position.

2. In a refrigerating apparatus which includes an endless conveyor having a plurality of containers in aligned sequence adapted to retain a substance to be refrigerated, means for propelling the conveyor along a predetermined path of travel, and refrigerating means disposed along the path of travel of the conveyor for effecting a refrigerating action upon the substance while in the containers whereby to effect the solidifying of said substance, the combination therewith of ejecting means disposed at a predetermined ejector station along the path of travel of the conveyor for ejecting the solidified substance from the containers, said ejecting means comprising means for inverting the containers, and means including a fixed abutment disposed in the path of movement of the inverted containers and operable by contact therewith for imparting an impact shock to the containers while in substantially inverted position.

3. In a refrigerating apparatus which includes an endless conveyor having a plurality of containers in aligned sequence adapted to retain a substance to be refrigerated, means for propelling the conveyor along a predetermined path of travel, and refrigerating means disposed along the path of travel of the conveyor for effecting a refrigerating action upon the substance while in the containers whereby to effect the solidifying of said substance, the combination therewith of ejecting means disposed at a predetermined ejector station along the path of travel of the conveyor for ejecting the solidified substance from the containers, said ejecting means comprising a first fixed abutment operatively engageable with the containers as they are moved to effect an inverting action thereon, and a second fixed abutment operatively engageable with the containers as they continue to move from inverted position under the influence of gravity to impart an impact shock thereto while the containers are in substantially inverted position.

4. A refrigerating apparatus comprising an endless conveyor, said conveyor having a plurality of containers in aligned sequence adapted to retain a substance to be refrigerated, a refrigerating compartment, refrigerating coils within the refrigerating compartment, a heating compartment, heating coils within the heating compartment, blowers for propelling air blasts respectively along preselected paths of travel through said compartments, and means for propelling the conveyor so as to effect the passage of said containers first through the refrigerating compartment to effect a refrigerating action upon the substance in the containers, and thereafter through the heating compartment so as to free adhesion between the refrigerated substance and the surfaces of the containers.

5. A refrigerating apparatus comprising an endless conveyor, said conveyor having a plurality of containers in aligned sequence adapted to retain a substance to be refrigerated, a refrigerating compartment, refrigerating coils within the refrigerating compartment, a heating compartment, heating coils within the heating compartment, blowers for propelling air blasts respectively along preselected paths of travel through said compartments, means for propelling the conveyor so as to effect the passage of said containers first through the refrigerating compartment to effect a refrigerating action upon the substance in the containers, and thereafter through the heating compartment so as to free adhesion between the refrigerated substance and the surfaces of the containers, and means for ejecting the refrigerated substance from the containers.

6. A refrigerating apparatus comprising a refrigerant circulation system having a compressor, heat transfer coils for cooling the compressed refrigerant gases delivered from the compressor, and evaporator coils within which the refrigerant is adapted to be evaporated to effect a cooling action; a refrigerating unit, an endless conveyor disposed within said unit, said conveyor having a plurality of containers in aligned sequence adapted to retain a substance to be refrigerated, a refrigerating compartment within the refrigerating unit, said evaporator coils being disposed within the refrigerating compartment, a heating compartment within said unit, said heat transfer coils being disposed within the heating compartment, and means for propelling the conveyor so as to effect the passage of said containers first through the refrigerating compartment to effect a refrigerating action upon the substance while in the containers, and thereafter through the heating compartment so as to free adhesion between the refrigerated substance and the surfaces of the containers to facilitate removal of the substance therefrom.

7. A refrigerating apparatus comprising a refrigerant circulation system having a compressor, heat transfer coils for cooling the compressed refrigerant gases delivered from the compressor, and evaporator coils within which the refrigerant is adapted to be evaporated to effect a cooling action; a refrigerating unit, an endless conveyor disposed within said unit, said conveyor having a plurality of containers in aligned sequence adapted to retain a substance to be refrigerated, a refrigerating compartment within the refrigerating unit, said evaporator coils being disposed within the refrigerating compartment, a heating compartment within said unit, said heat transfer coils being disposed within the heating compartment, blowers for propelling air blasts respectively through said refrigerating and heating compartments, and means for propelling the conveyor so as to effect the passage of said containers first through the refrigerating compartment to effect a refrigerating action upon the substance while in the containers, and thereafter through the heating compartment so as to free adhesion between the refrigerated substance and the surfaces of the containers to facilitate removal of the substance therefrom.

JAMES NELSON HELPBRINGER.

REFERENCES CITED

The following references are of record in the file of this patent:

UNITED STATES PATENTS

| Number | Name | Date |
| --- | --- | --- |
| 1,742,194 | Bennett | Jan. 7, 1930 |
| 1,817,890 | Birdseye | Aug. 4, 1931 |
| 1,924,988 | Grayson | Aug. 29, 1933 |
| 1,939,109 | Davidson | Dec. 12, 1933 |
| 2,031,812 | Barrett et al. | Feb. 25, 1936 |
| 2,239,234 | Kubaugh | Apr. 22, 1941 |
| 2,252,913 | Baer | Aug. 19, 1941 |